(12) United States Patent
Argaiz (10) Patent No.: US 7,941,339 B2
(45) Date of Patent: May 10, 2011

(54) METHOD AND SYSTEM FOR MANAGING CUSTOMER NETWORK VALUE

(75) Inventor: Joseluis Iribarren Argaiz, Madrid (ES)

(73) Assignee: International Business Machines Corporation, Armonk, NY (US)

( * ) Notice: Subject to any disclaimer, the term of this patent is extended or adjusted under 35 U.S.C. 154(b) by 849 days.

(21) Appl. No.: 11/282,866

(22) Filed: Nov. 17, 2005

(65) Prior Publication Data
US 2006/0143081 A1 Jun. 29, 2006

(30) Foreign Application Priority Data

Dec. 23, 2004 (EP) .................................... 04300948

(51) Int. Cl.
*G06Q 30/00* (2006.01)
(52) U.S. Cl. ................................. 705/14.49; 705/14.52
(58) Field of Classification Search .................... 705/10, 705/14, 26, 27, 14.1, 14.13, 14.49, 52, 14.53
See application file for complete search history.

(56) References Cited

U.S. PATENT DOCUMENTS

| | | | | |
|---|---|---|---|---|
| 5,361,386 | A * | 11/1994 | Watkins et al. | 345/647 |
| 5,615,351 | A * | 3/1997 | Loeb | 700/90 |
| 5,774,868 | A * | 6/1998 | Cragun et al. | 705/10 |
| 5,791,155 | A * | 8/1998 | Tulpule | 62/211 |
| 5,918,014 | A * | 6/1999 | Robinson | 709/219 |
| 6,421,648 | B1 * | 7/2002 | Gagnon et al. | 705/1 |
| 7,610,367 | B2 * | 10/2009 | Canright et al. | 709/223 |
| 7,689,452 | B2 * | 3/2010 | Lam et al. | 705/10 |
| 2003/0187713 | A1 * | 10/2003 | Hood | 705/9 |
| 2003/0216942 | A1 * | 11/2003 | Hawks | 705/2 |
| 2005/0089215 | A1 * | 4/2005 | Staelin et al. | 382/157 |

OTHER PUBLICATIONS

"Teacher Isolation and Communication Network Analysis in Primary School" Educational Administration Quarterly; Thousand Oaks; Apr. 1999; Inge Bakkenes et al.*
"The Buzz on Buzz," Harvard Business Review, Nov.-Dec. 2000 (excerpts only).
"Maximizing the Spread of Influence Through a Social Network," Kempe, Kleinberg, and Tardos, Cornell University, 2003.
"Mining the Network Value of Customers," Domingos and Richardson, University of Washington, 2001.

* cited by examiner

*Primary Examiner* — Donald L Champagne
(74) *Attorney, Agent, or Firm* — Cantor Colburn LLP (57) ABSTRACT

A method, system and computer program product are disclosed for evaluating a customer network value of a set of customers for a given marketing campaign, said method comprising the steps of storing for each customer static information, collecting for each customer, historical and time cumulative network behavior data, building a customer network map from network behavior data said map describing network relation between nodes, one node representing one customer, computing the social network parameters for the nodes of the network map, selecting the most relevant social network parameters according to the objectives of the given marketing campaign, and, computing for each customer a Customer Network Value Index (NVI) by combining the most relevant social network parameters and static information. When a static information profile is defined for an extended customer population, applying data mining techniques on this population allows estimating a probabilistic NVI for each customer in the extended customer population for which no NVI has been computed.

9 Claims, 5 Drawing Sheets

# METHOD AND SYSTEM FOR MANAGING CUSTOMER NETWORK VALUE

FIELD OF THE INVENTION

The present invention generally relates to a method and system for improving marketing campaigns. More particularly, the method and system of the present invention relates to measuring and using the Customer Network Value.

BACKGROUND OF THE INVENTION

With the advent of networked electronic media (Internet, Web, mobile phones) "word-of-mouth"—the spontaneous passing of messages between individuals—has reached a new dimension, both quantitatively, as it is much easier to pass information along, and qualitatively since the integrity of such information is better preserved.

This opportunity has not gone unnoticed to the marketing profession which is making extensive usage of it through techniques generically labeled as "viral marketing". An example of those are the buttons to send pages to friends almost universally present in web sites nowadays. Similarly, e-mail campaigns inviting people to forward the message to friends or product or service where its mere acceptance involves notifying others (such as the free Hotmail promotion) are widespread. Thus, the topic has reached the level of subject matter at business schools. For example, see the article entitled "The Buzz on Buzz," published in the *Harvard Business Review, November-December,* 2000.

The article describes how word of mouth has become a key component of many marketing campaigns and gives categorized examples of its usage by various companies although it does not provide any analytical method for implementing or measuring it in a systematic way.

Word of mouth effectiveness is rooted on the size and structure of the participating individuals' social network. Social Network Analysis and information propagation dynamics on complex networks of various topologies (Random, Small World, Scale Free) have recently been the subject of significant amount of research and theoretical analysis, both in the Industry and Academia. See the article "Maximizing the Spread of Influence through a Social Network," Cornell University, 2003. This research paper develops mathematical models to predict the extent to which "word-of-mouth" effects will take hold when the most "influential" individuals in the network are initially targeted but does not provide any method to quantitatively determine who those individuals are or to measure their specific degree of influence.

Also, the trend is becoming an industry unto itself and has given rise to a slew of web-based companies trying to capitalize on internet-assisted social network dynamics for a variety of business models: Support to sales teams by providing access to key customer contacts through "power networking", job searching, or the expansion of personal relationships for dating and friendship. For example, the LinkedIn web site allows people to extend their personal relationships network by sending messages to one another but does not allow any form of one-to-many marketing application of the tool.

However, for all the requests to forward marketing messages found today in web sites and marketing campaigns, solutions for direct and systematic collection, quantification and use of individuals' word-of-mouth behavior data to improve marketing campaigns targeting and efficiency, are not available. For example, the research paper, "Mining the Network Value of Customers," University of Washington, 2002, proposes an indirect method based on the data mining of collaborative filtering databases. Since data mining techniques consist in computing exact values on a sample population and approaching values for another population on the basis of the results on the sample population. However in this document there is no suggestion of how to compute customer Network Value based on a direct, efficient and practical observation of the sample population behavior. However, collaborative filtering does not involve direct interaction between individuals and the method detects just generic influences between customers but not the direct ones characterizing one-to-one word of mouth.

Thus, no solution is provided in the background art to detect, collect or compute Customer Network Value arising from direct observation of word-of-mouth interactions between individuals (also known as "network behavior") for any population of customers, large or small. There is a need for an efficient method and system to determine and apply the Customer Network Value to mass marketing communication campaigns.

OBJECTS AND SUMMARY OF THE INVENTION

It is therefore an object of the present invention to provide a method and system for collecting information on direct interactions between individuals so as to compute and use their customer Network Value for mass marketing communication in an efficient and systematic way.

It is another object of the invention to provide a method ands system allowing the expansion of this method to customer populations for which it is not possible to collect all the information necessary for the computation of the customer Network Value.

These objects are achieved, in one embodiment by a method for evaluating a customer network value of a set of customers for a given marketing campaign, the method comprising the steps of, storing for each customer static information, collecting for each customer, historical and time cumulative network behavior data, building a customer network map from network behavior data said map describing network relation between nodes, each node representing one customer, computing the social network parameters for the nodes of the network map, selecting the most relevant social network parameters according to the objectives of the given marketing campaign, and computing for each customer a Customer Network Value Index (NVI) by combining the most relevant social network parameters and static information.

The advantages of the present invention, method and system are the following:
 A. The NVI constitutes a new customer segmentation criteria, essentially independent from any other criteria currently in use, which allows targeting customers on the basis of their word-of-mouth network behavior, a new option for marketing practitioners
 B. The NVI allows the characterization of markets according to different network types which permits the evaluation of their potential before entering them
 C. The method is based on detecting the presence of causal relations between individuals, something difficult to do purely through data mining techniques
 D. The method does not require complete knowledge of the social network of interacting individuals thus allowing its use with partial information only
 E. The data gathering system in the method is independent of the specific type of marketing action where data is drawn upon which permits using it in conjunction with almost any marketing tactic F. The NVI is built so as to be cumulative and can evolve over time as subsequent word-of-mouth network behavior is detected. This allows adapting strategies as new data on customer behavior becomes available G. The NVI dynamic evolution reflects the fact that social networks are not static objects but evolve with time. This makes the index very appropriate to deal with social networks based on electronic media which evolve quite rapidly H. The method and system is based on the observation of knowledge-sharing interactions between individuals which is a stronger and richer technique than those, like collaborative filtering, based on indirect interactions I. The method combines word-of-mouth network behavior data with firmographic and business data to provide a wholesome view of the customer profile The method allows the graphical representation and visualization of customers' social interactions for a more in-depth, intuitive and thorough analysis

DETAILED DESCRIPTION OF THE PREFERRED EMBODIMENT

The term "Customer Network Value" as used herein is defined as the quantified monetary value of a customer's influence on the market on behalf of a particular product or brand by virtue of the positive messages disseminated through her relationship network. Since any customer influence on the market can be interpreted as generating savings of the vendor's own marketing efforts, it is generally the cost of such marketing efforts that is assigned as the particular Network Value. In general, a customer's impact on the market can be achieved by a multiplicity of means: direct recommendation of the product to other people, indirect testimonial through its public use, providing ratings of the product in the media.

There's no doubt that a person's choice of a product is usually heavily influenced by her family, friends, business associates, acquaintances or other users. Leveraging such word-of-mouth networks for marketing can be more cost-effective than the conventional marketing method because it relies on the customers themselves to provide most of the promotional effort. Besides, as customer's recommending a product are seen as independent trusted sources, their credibility is much higher than that of the seller's own marketing efforts. Frequently, those users' testimonials are actively sought out by potential customers as input to make a purchase decision or as reassurance after a recent acquisition.

Due to the difficulty of detecting people's behavior influencing the marketplace in regards to a particular product or service, the concept of "Customer Network Value" has never been included systematically on any marketing plans. Thus, companies have created mechanisms to entice their customers to recommend their products to others in the hopes that whatever their effectiveness, it would be something on top of everything else. So, beyond this casual approach, it has not been possible to detect, track, evaluate or otherwise use "Customer Network Value" in any significant way.

Nevertheless, the business and marketing literature has recognized network effects (also known in Economics research as network externalities) to be of critical importance to success in the marketplace, specially for those industries involved with information goods and services (software, telecommunications, media) or those where brand name recognition is a key factor in their marketing approach (consumer goods). Ignoring network effects when deciding which customers to market to can lead to severely sub optimal decisions. In fact, in many cases it can only be done at the manufacturer's peril. The cases of technically inferior products prevailing in the marketplace because they managed to better leverage the network of users are business school case studies today (for example, Windows prevailing over OS/2 in the PC operating systems market or VHS over BETA in VCR formats).

The advent of electronic communications media (notably, but not exclusively, the Internet) has led to the availability of large amounts of data from which the necessary network behavior can be detected thus enabling a proactive use in Marketing of the Customer Network Value. The abundance of computer power to capture and store each user's behavior while using the Internet (e-mail, chat rooms, forums, bulletin boards, newsgroups, web pages, RSS channels, online subscriptions, etc.) makes it possible to collect information on social relationships and map individuals' network behavior.

Although usage of any electronic media or application lends itself nicely to determine the Customer Network Value (mobile phones, SMS messages, e-Mail, search engines, web pages browsing, e-commerce) we assume for this example a particular scenario consisting of customers that recommend products to others through e-mail in combination with special web forms. To encourage the pass-along behavior and increase the process spread, some form of reward to participants can be included.

Even if the concept of CNV (Customer Network Value) and of the preferred embodiment is generally discussed in connection with the Information Technology industry, however, it is not intended to limit this application to such industry. The method and system of the preferred embodiment will find application in any sector or market segment where the customers' network behavior can be detected and collected through electronic means.

The measure of customer value in traditional CRM (Customer Relationship Management) practice, the Customer Lifetime Value (also known as Customer Intrinsic Value) is defined as the profit resulting from any particular customer business with the company over her life as a customer after deduction of related costs, and especially those resulting from marketing to her. Thus, customers are only profitable for the company if the benefit of their purchases exceeds the cost of marketing to them over the considered period. However, this approach does not account for the profit (in the form of a reduction of marketing expenses) that results for the company when its customers promote the product through their relationship network. Thus, someone may be worth being marketed to, even if she is not actually buying anything, if the value of her recommendations to others outweighs the marketing cost, thereby delivering a positive Customer Network Value.

Figure 1:
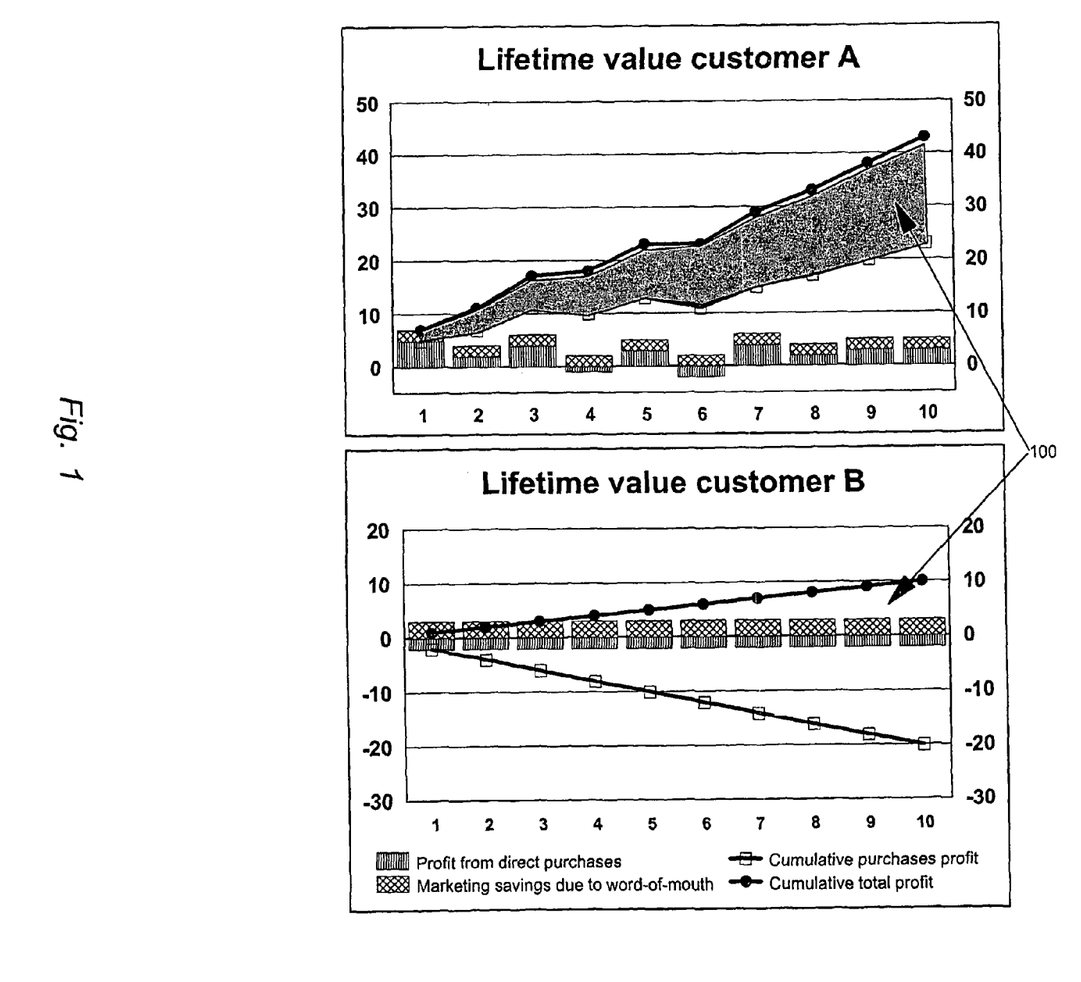
FIG. 1 is a chart that illustrates the notion of customer Network Value in accordance with the present invention by comparing those of two hypothetical customers.

FIG. 1 illustrates the concept of Customer Network Value. The charts show profit delivered to the company by two customers considering both their purchasing (intrinsic) and network behavior components. Customer A is purchasing the product from the company during most of the considered period yielding profits in most of the time intervals (as shown by bars with vertical lines). The cumulative value of those profits over time is indicated by the line with empty squares. At the same time, customer A is also promoting the product among her social network thus delivering a profit to the company, in the form of marketing costs reduction, over each time period. Now, the cumulative value of both network behavior derived profits plus those resulting from purchases is indicated by the line with filled in circles above. Finally, the total Customer Network Value of this individual is represented by the shaded area between both lines.

Similarly in FIG. 1, customer B is consistently promoting the company's products through her network behavior as represented by the vertical bars with the oblique grid. However, this customer is not purchasing any product, in spite of her being marketed to, which leads to a profit loss for the company in every time period. Again, cumulative value of those losses is represented by the line with empty squares. Once the "purchases" loss is subtracted from the network behavior profit to yield the total profit line of customer B, we realize that the Customer Network Value, although smaller than that of customer A, is still positive. This indicates that customer B is worth being marketed to even if actual profit from pure purchases is negative. As before, her (positive) CNV is represented by the shaded area between the upper line with filled circles and the X axis.

The first step towards measuring a customer's Network Value is to detect and collect the network behavior. This implies learning who are her relationships and creating a Social Network Map of them, identifying those that are more frequently being communicated with, what is the relevance of those contacts to the business and, recursively, discovering the same information about each and every contact down the treelike structures that represent the message path.

Figure 2:
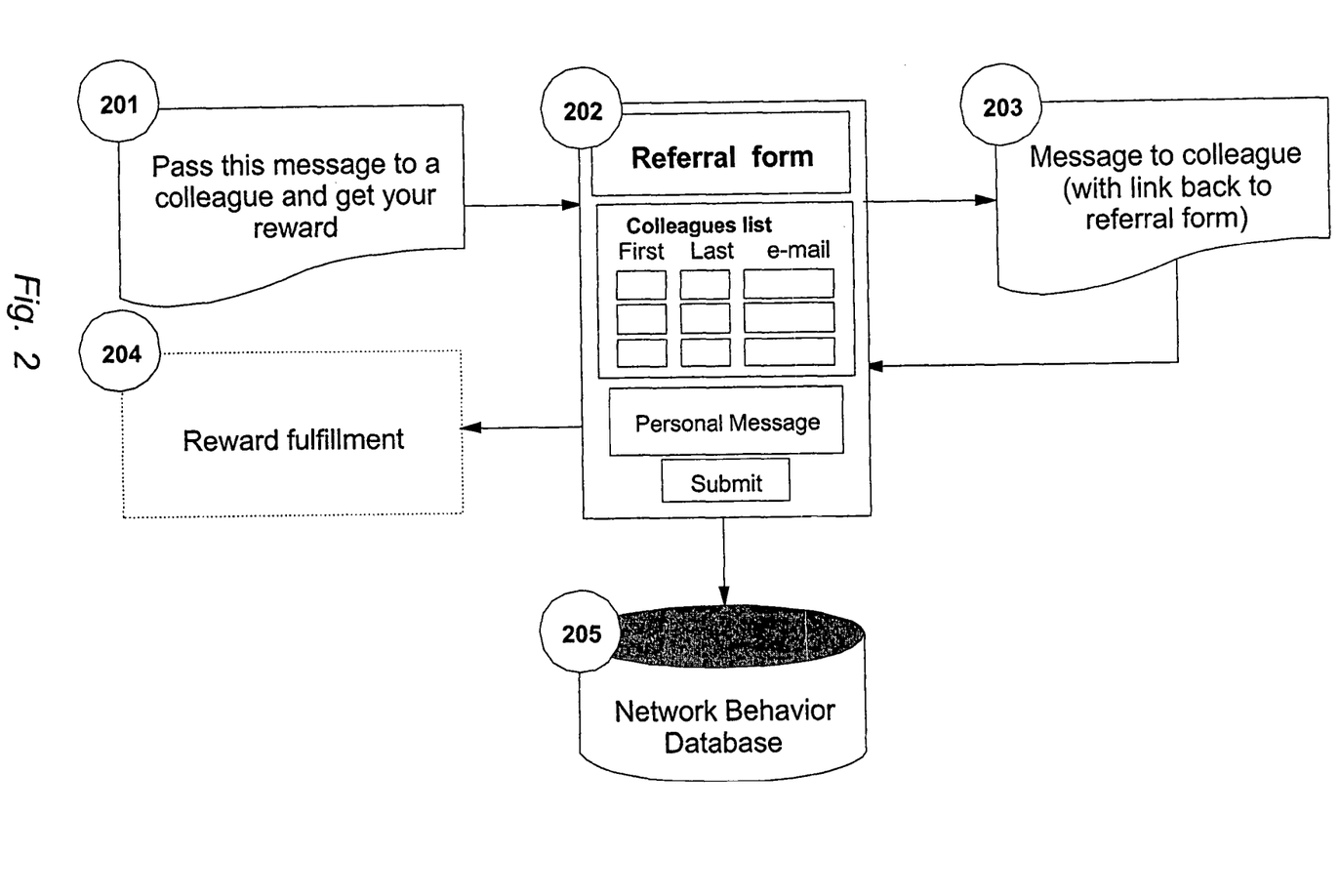
FIG. 2 is a flowchart that illustrates a system for capturing data on customer network behavior between individuals according to one of the preferred embodiments.

FIG. 2 illustrates, in its simplest form, the flowchart structure of the application that can capture customers' network behavior in the preferred embodiment of this invention. It is a web-based marketing campaign tool that operates as follows: In step 201 an e-mail is sent to a subset of customers from within the company's customer set including, typically but not exclusively, the following: a) a commercial offer, b) an invitation to pass the offer or message along to associates or colleagues, and c) an incentive or reward to foster the pass-along (word of mouth) behavior. The process for submitting candidates to receive the forwarded message involves a web form as depicted in step 202 which includes personalized copy, a unique URL linked to the originating e-mail and open text fields to enter names and e-mail addresses of the intended recipients. Upon submission of this form, the system forwards the e-mail message as per the sender's instructions (step 203), opens up a window or any other device allowing the sender to get her reward for the pass-along behavior, such as document or software download, concert ticket, prize draw enrollment or other (step 204) and stores in a database all the information related to this referral (step 205).

The actual mechanism for network behavior detection and capture will vary with the media being used (mobile phone, SMS message, bulletin board submission, instant messages, forum participation, blogs, web recommendation, etc.) but will generally include the following components: 1) A company message to be passed along, 2) A reward or incentive for doing so, 3) A method to identify both sender and recipients, 4) A system to establish a unique link between the two, and 5) A storage system and process to save all the information collected.

It is important to note as well that message pass along needs not be a one-to-one affair. It can also be one-to-many as long as the identities of the message recipients can be determined and their relationship with the sender established. As an example, an individual's posting to a blog whose members are known, automatically defines implicit instances of multiple message transmission from the blog owner to each and every one of the blog subscribers. Finally, although knowledge of the message recipients' identities allows for better marketing segmentation, network behavior from a known individual towards anonymous recipients is also valuable and can be used in the context of the method of the preferred embodiment.

The capturing of message pass-along behavior is important because it allows, for the first time, the creation of a direct, quantitative metrics of any individual's Network Value which depends not only on the number or frequency of messages she passes to others but also of her position in the network. Such position, that changes with time, can be defined and measured through the following two scores: Network Value Extent (NVE) and Network Value Strength (NVS).

First, an individual's Network Value Extent is measured by the total number of different people who can be reached by continuous paths through the known social network starting at that particular individual. Thus, a message initially sent by the individual at the top of the chain, if continuously pushed forward by successive recipients would eventually reach everyone on that individual's Social Network. Thus, in Social Network science terminology, any individual's Network Value Extent would coincide with the size of her fully connected graph.

However, not all individuals in the network are alike, nor all instances of message propagation are equally valuable for the company spreading the message. Some people are company CEOs or C-level execs, while others are clerical officers or secretaries with less purchasing or decision power. Similarly, some belong in industries or business segments that are particularly attractive to the company sending the message whereas others pertain to non-profit, government or other organizations which may be of different priority as targets. These differences lead to variations in the marketing value of the forwarded messages and must be taken into consideration when calculating the customer Network Value. Such is the purpose of the second score to be measured, the individual's Network Value Strength.

Figure 3:
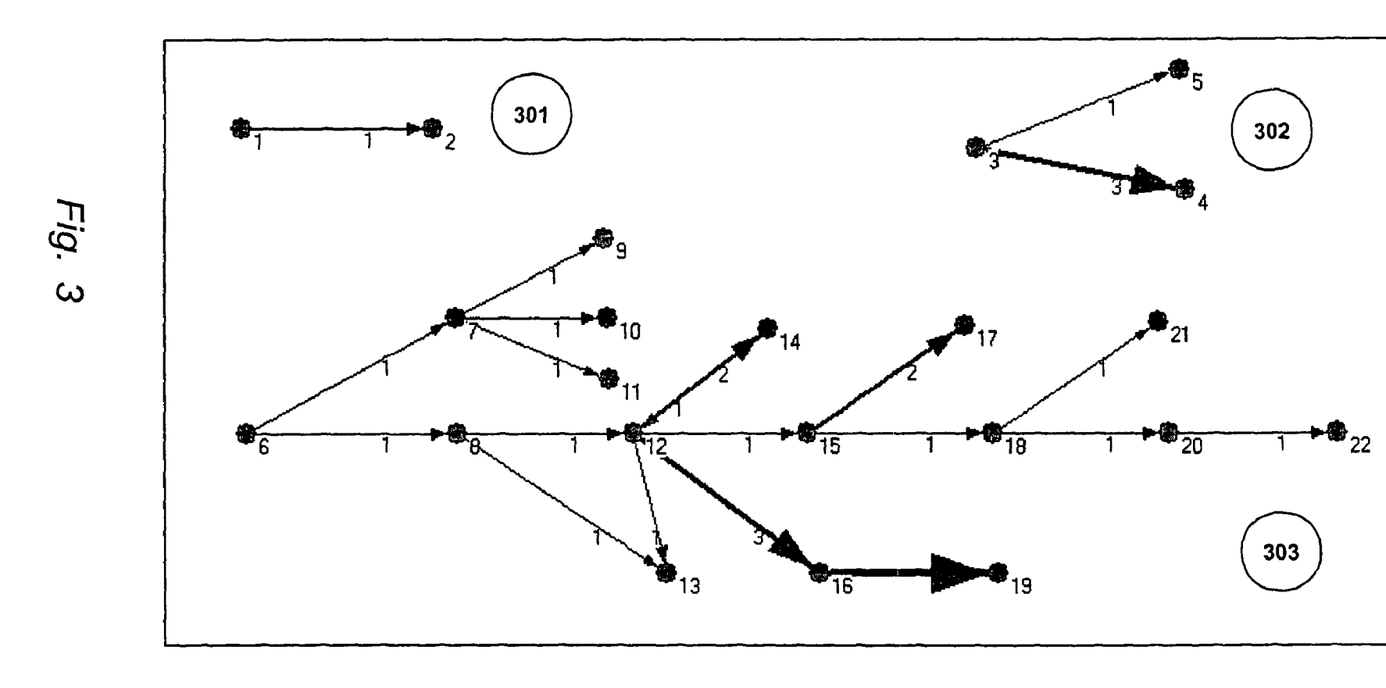
FIG. 3 shows social network maps of several customers built with the network behavior data captured on them through several iterations of the marketing activities according to the preferred embodiment.

FIG. 3 shows the network graphs of hypothetical detected network behavior for several customers. The graph shown in FIG. 3 is a graphical representation of the internal mapping of the corresponding customer data, each node representing one customer. In the graph circles represent individuals and arrows represent instances of a company message being forwarded from one individual to the next. Thicker arrows indicate that more than one message has been sent between the two individuals as detected through cumulative observation. Thus, 301 is an instance where only one message has been sent from person 1 to person 2. Similarly, 302 shows person 3 sending messages to both individuals 5 and 4 (3 messages to the latter). Finally, 303 depicts a more complex, and richer, structure where the path of forwarded messages initiated by person 6 extends over several steps branching out to a higher number of people, some of whom have received the same message several times and from various sources. This social network behavior map is used in this invention as the key tool for determining a Customer's Network Value Index.

The network map allows calculating many different parameters related to each individual's social network structure. A suitable algorithm executed on those parameters which includes, without limitation, total node degree, first and second neighbors degree, maximum undirected path length and clustering factor, leads to the determination of each individuals Network Value Extent score.

Now, the network behavior information that surfaces from the analysis of each person's network behavior map, is merged with firmographics and personal data available in the company's customer databases. This combination allows calculating a whole set of new and independent parameters that are predicated of the binary relationship between individuals in adjacent nodes. Again, as before, a suitable algorithm executed on the new set of parameters which include, without limitation, nodes out degree, network centrality, node betweeness, arc value, link diversity or node rank differential, lead to the determination of each individual's Network Value Strength score.

Yet another algorithmic combination of each individual's Network Value Extent and Strength scores and that of those nodes downstream in her network map factored in recursively (with the appropriate attenuation factor based on network distance), delivers a score for her Network Value which constitutes the person's Customer Network Value Index (NVI).

However it is inconceivable that a complete Social Network Map can be unveiled for every customer because of the limits in time and resources that can be devoted to the effort in real-world situations. Besides, even if that was possible, it might prove to be an exercise in futility since peoples' network behavior evolves over time and the supposedly final map would not entirely reflect reality when completed. Thus, it becomes necessary to extrapolate the explicitly calculated Customer Network Value Indexes from a subset of individuals to the entire customer set in order to obtain probabilistic Customer Network Value Indexes.

Data mining techniques can help compute the probabilistic Customer Network Value Index. Within the discipline of data mining, a set of tools addresses the so called regression and segmentation problems. Regression tools develop predictive models from historical data. Such models predict the value of a variable (the response variable) based on the value provided for another set of variables. A good model delivers predictions close to the actual values of the response not only for the data used in building the model, but also for other data from the same set that was not used to build the model. Thus, good models accurately predict the response variable value for any input. Modern regression tools select the relevant predictors for inclusion in the model. They can also unveil complex relationships between predictors and responses and embed them into a model that discovers accurate, and previously not available, information.

It is this possibility of discovering new information which makes data mining useful to the task of assigning a probabilistic Customer Network Value Index to individuals whose network behavior has not been explicitly detected. Data mining discovery mode will use in this context predictors that describe the customer (such as demographic, firmographic and psycographic characteristics) and the customer's recorded behavior in terms of buying records, historical product preferences, participation in company and industry events or response to previous marketing campaigns. First step is for the Data Mining application to profile, on all those predictors, the individuals whose network behavior, and hence their Network Value Index, are known. This leads to the identification of profiles that may anticipate, or predict, a certain network behavior for the corresponding individuals. Finally, it is fairly straightforward to assign the same Network Value Index, within a probability range, to individuals without an identified network behavior but whose known business profiles indicate they may behave, in a similar way.

Figure 4:
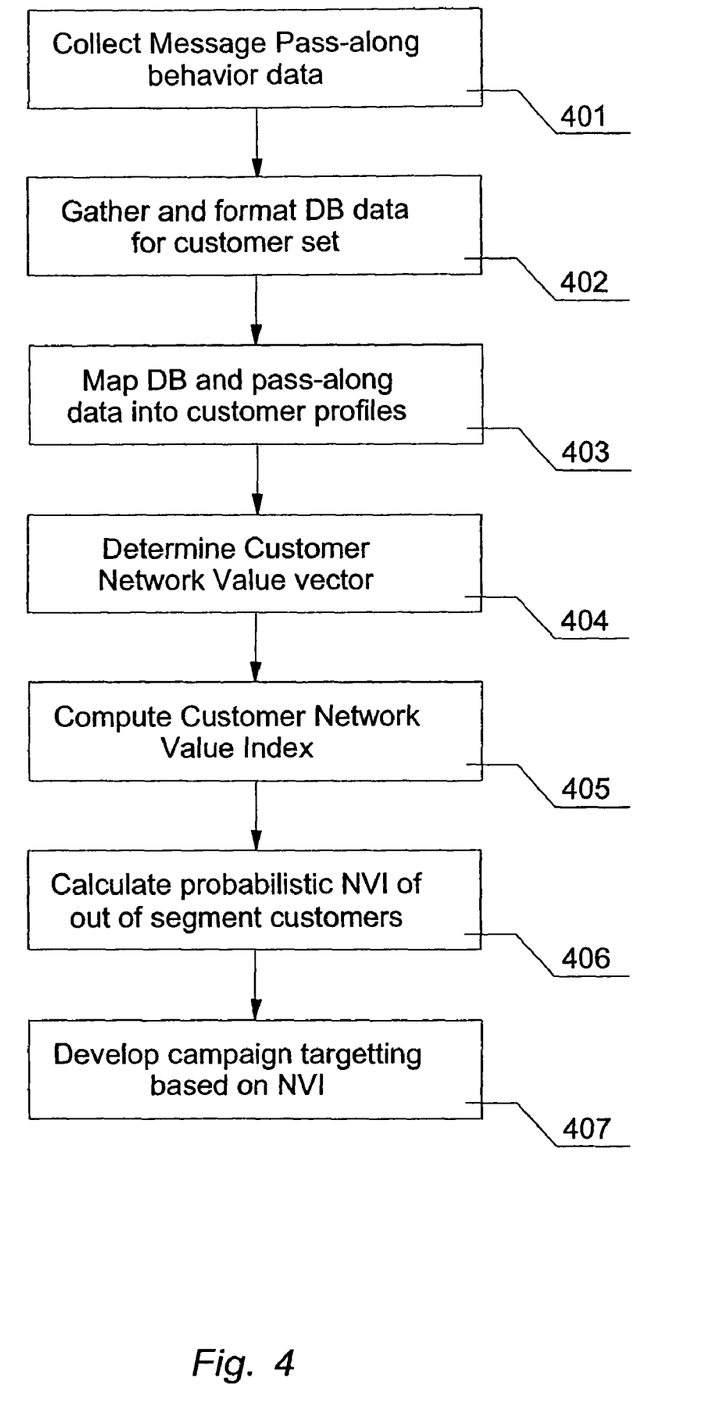
FIG. 4 is a flowchart illustrating an example of the steps that must be performed to implement the preferred embodiment.

FIG. 4 is a flowchart illustrating, as an example, the steps to be followed to execute the present invention in its preferred embodiment. At step 401 data is collected on the network behavior (message pass-along activity) of a subset of the company's customers based on their reaction to marketing campaigns that are equipped with mechanisms to detect and register such behavior. This process is cumulative and the body of collected data may be the result of aggregate information gathered over many different marketing activities carried over an extended period of time. Those can encompass a variety of tactics beyond the web based one described here as the preferred embodiment. Example of possible tactics to detect network behavior, directly or indirectly, are SMS messages, moderated chat rooms, referrals requested in telemarketing campaigns, references provided at events or discount offerings for group purchases to name just a few.

At step 402, the data gathered in the previous step is properly formatted and merged with the demographic, firmographic, psycographic and business information available on those individuals in the company's, or in third parties, databases. Then, at step 403, the body of data resulting from the previous phase is organized so as to classify the customer set into different segments according to standardized customer profiles.

In step 404, the pass-along behavior network map for each customer in the subset is created. Specialized Social Network Analysis software (one that automatically applies Network Analysis techniques to social networks) is then used to calculate the relevant parameters of the customers' detected relationships network map. These types of programs are known in the art. Several of them can be used at this step. The input read by the program is the network map, the output provides for each node of the map a set of parameters. Those may include, among others and without limitation, metrics such as:

Node degree: The number of incoming or outgoing edges of a given node

Nodes degree distribution: The probability of a node in the network to present a given degree Node degree centrality: Portion of the nodes in the network adjacent to the one being considered Node betweenness: The fraction of all paths between any two nodes in the network that pass through the particular one Maximum path length: The number of edges of the longest path between any two nodes in a fully connected graph Clustering coefficient: The probability that any two nodes in the network that are connected to a third common one are also connected to each other Among all the parameters provided by the usual Social Network Analysis software, the most relevant are automatically selected in the method of the preferred embodiment, which is oriented to a fixed marketing campaign strategy. In a more sophisticated embodiment the operator can choose among different types of marketing campaigns.

In the preferred embodiment the resulting network parameters of each and every node are combined through the use of a suitable algorithm to produce a score for the Network Value Extent or Strength Indexes. This algorithm involves, without limitation, arithmetic or algebraic operations such as summation, subtraction, multiplication, division or powers. The mathematical formula of such algorithm is not unique as it depends on the specific network or customer type of interest in each case.

As an example of the simplest embodiment, the Network Value Extent score calculation algorithm for a node could be a straight multiplication of some, or all, of the network parameters measured for such node:

NVE(node)=(Node Degree)×(Node Centrality)×(Max. Path length)×(Clustering coefficient)

In other embodiments, Boolean variables (those taking discrete values such as 1 if a condition is met, 0 if it is not), lookup tables or statistical analysis methods are used to combine network behavior data with customer firmographics and business data. As a result, both the NVS and NVE scores are calculated and, put together, lead to a dimension 2 vector, the so called Customer Network Value Vector. Further, in step 405, Customer Network Value Vectors of all individuals in each and every fully connected graph are recursively combined with one another (through vector multiplication with a reduction factor to account for the decaying impact of distant nodes) to determine the Customer Network Value Index of each individual in the graph.

In step 406, data mining techniques are used to determine probabilistic Customer Network Value Indexes for all customers in the customer set, based on those calculated in the previous step for the subset of customers with already measured indexes and on the predictive value of their common profiles, as discovered by the data mining tool. It is in this step as well that the subset of customers with measured indexes is divided in two (one as data source, the other as benchmark) to run the data mining tools against them so as to "train" the predictive algorithm for more accurate results. This training step must take place every time there is a substantial update on the measured customer subset.

Finally, it is in step 407 that the resulting customer value indexes for all customers (both measured and probabilistic) are loaded on the company's marketing databases and subsequently used as targeting criteria for marketing campaigns. This index, by its construction and because of the new message pass-along information built into it, is essentially independent from any other criteria and becomes the selection factor for marketing campaigns seeking to optimize overall customer value by including their, up until now, hidden value provided by the customers' word-of-mouth marketing effect.

Figure 5:
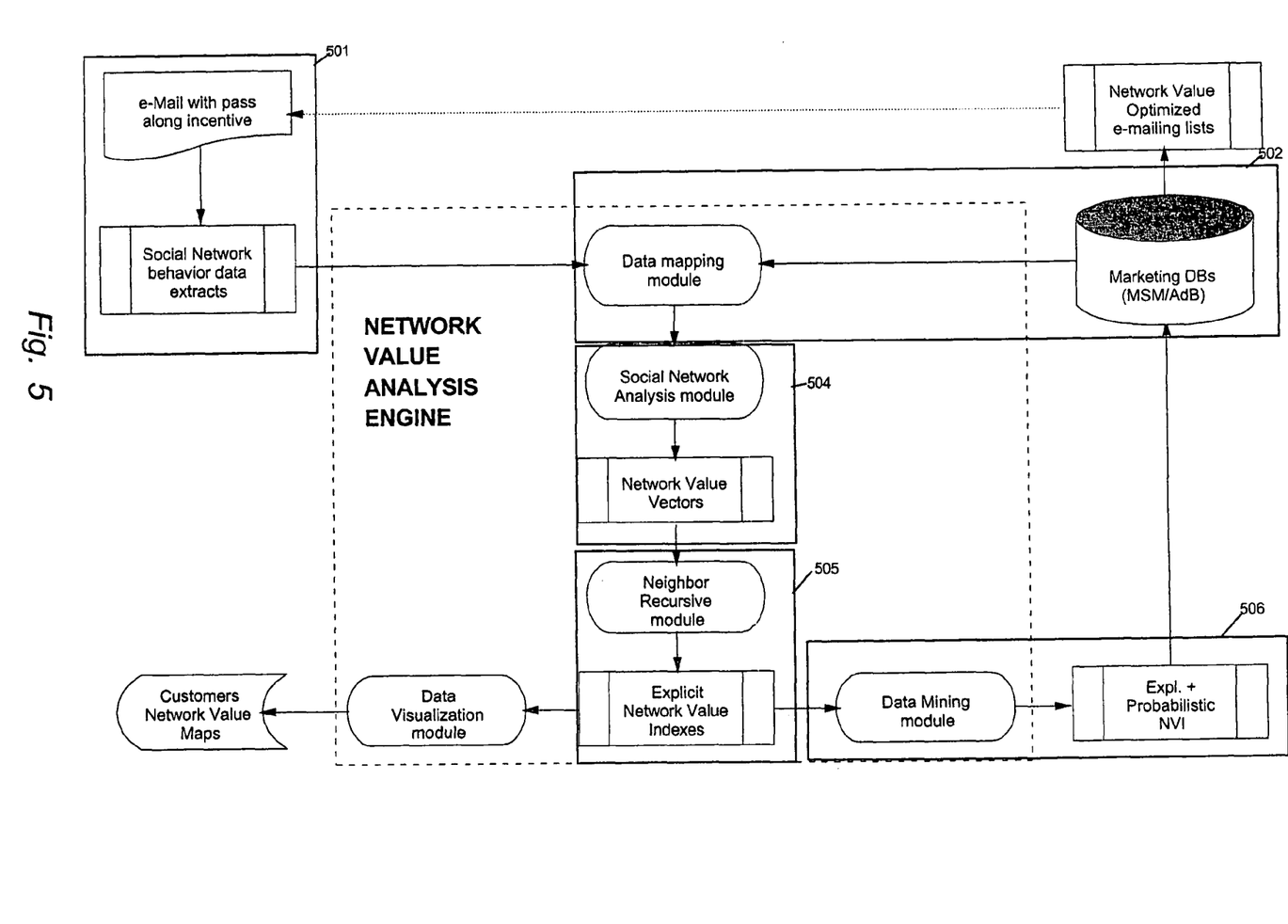
FIG. 5 illustrates the logical blocks of the general method of collecting and measuring customer Network Value according to the preferred embodiment.

FIG. 5 illustrates the logical blocks of the general method of collecting and measuring Customer Network Value according to the preferred embodiment. This method is implemented as a program operating on a workstation having a GUI with the user which can be either a marketing specialist or merely an operator. The workstation can access several databases for customer information. Such information can be either customer static information or customer network behavior data collected as described earlier in the document in relation with the description of FIG. 2. The input variables read by the program can be the customer e-mail address, the first name, last name (from the customer static information database), campaign-id, pass along message activity such as the number of times messages are sent and the name of the receivers (collected). Each numbered logical block in FIG. 5 reflects corresponding steps in the general flow chart of the method of the preferred embodiment as described in FIG. 4. Box 501 is for the step of collecting customer Message Pass-along behavior data. This data is used by a second block, 502, for execution of steps 402 and 403. The collected data and static information from the Marketing database are formatted and used for creating a map of the customer network behavior. According to step 404 of the general flow chart of FIG. 4, the next logical block (504) is for execution of a Social Network Analysis program which could be one of the prior art: the result of running this program are parameters computed for each customer reflecting the input given for mapping them. Furthermore, this logical block selects the specific parameters which are relevant to the type of marketing campaign the method is being executed for. The output of logical block 504 is a network value vector computed for each customer. The next logical block, 505, is for applying a formula to the vector elements to compute, for each customer, a Network Value Index (NVI) reflecting the customer network value. A formula is used to compute the NVI on all vectors; this can be a simple or more sophisticated formula as discussed earlier in the document in paragraph 27. With a data visualization module, a graph representing the network map created by logical block 502 can be visualized to the user and printed as represented in FIG. 3. In logical block 506 a data mining module as known in the prior art extends the result obtained on the set of customers used in the preceding logical blocks to a larger population in case a mass marketing campaign is needed. With the use of the data mining module, probabilistic NVI are computed for the other customers for whom no network behavior data has been collected. It is noted that the probabilistic NVI constitute a predictor of future customer network behavior. The NVI and the probabilistic NVI are stored in the marketing database and are used to prepare, as an example, Network Value Optimized e-mailing lists of customers with, for instance, the customers having the highest NVI or probabilistic NVI.

Although the present invention has been described in connection to a specific preferred embodiment, various changes and alternatives may be proposed by anyone familiar with the disciplines involved. Nevertheless, any such changes and alternatives are supposed to be encompassed within the scope of the appended claims as long as their final purpose remains to measure and assign Network Value Indexes to individuals of a set based on their detected message pass-along activity.

What is claimed is:

1. A method for determining a customer network value for a first set of customers for a given marketing campaign, said method comprising the steps of:
   storing for each customer static information;
   collecting, for each customer, historical and time cumulative network behavior data, the network behavior data being obtained via email and web forms;
   building a customer network map from network behavior data, said map describing network relations between nodes, each node representing one customer;
   computing by a computer a plurality of social network parameters for each node of the network map;
   selecting a predefined subset of the social network parameters according to predefined objectives of the given marketing campaign;
   computing by a computer for each customer a customer network value index (NVI) by combining the predefined subset of social network parameters and static information; and
   producing a list of customers and their associated NVI,
   wherein the step of computing the social network parameters for each node of the network map comprises the step of computing one or more of the group consisting of: the node degree, the node degree distribution, the node centrality, the node betweenness, the maximum path length and the clustering coefficient parameters, and wherein the step of computing for each customer a customer network value index (NVI) consists in computing for each customer the expression:

(Node Degree)×(Node Centrality)×(Max. Path Length)×(Clustering coefficient).

2. The method of claim 1 further comprising the steps of:

storing, for a second set of customers, a customer profile reflecting the customer static information of the second set of customers; and applying data mining techniques to the second set of customers for which static information are stored but no network behavior data has been collected, said data mining techniques providing a probabilistic NVI for the second set of customers.

3. The method of claim 1 wherein the step of computing the social network parameters consists in running a specialized Social Network Analysis software.

4. The method of claim 1 wherein the step of computing for each customer a customer network value index (NVI) comprises a step of recursively combining Network Value selected parameters of neighbor nodes downstream the information propagation tree of the network map.

5. The method of claim 1 further comprising a step of visualizing the customer network map by displaying graphs representing the nodes and their relations as propagation trees.

6. A non-transitory computer readable storage medium comprising programming code instructions for executing the steps of a method for evaluating a customer network value of a first set of customers for a given marketing campaign, the method steps comprising:

storing for each customer static information;

collecting, for each customer, historical and time cumulative network behavior data, the network behavior data being obtained via email and web forms;

building a customer network map from network behavior data, said map describing network relations between nodes, each node representing one customer;

computing a plurality of social network parameters for each node of the network map;

selecting a predefined subset of the social network parameters according to predefined objectives of the given marketing campaign;

computing for each customer a customer network value index (NVI) by combining the predefined subset of social network parameters and static information; and producing a list of customers and their associated NVI, wherein the step of computing the social network parameters for each node of the network map comprises the step of computing one or more of the group consisting of: the node degree, the node degree distribution, the node centrality, the node betweenness, the maximum path length and the clustering coefficient parameters, and wherein the step of computing for each customer a customer network value index (NVI) consists in computing for each customer the expression:

(Node Degree)×(Node Centrality)×(Max. Path Length)×(Clustering coefficient).

7. The computer program product of claim 6, wherein the method steps further comprise developing targeting for the marketing campaign based on the list of customers and their associated NVI.

8. The computer program product of claim 6, wherein the method steps further comprise:

storing, for a second set of customers, a customer profile reflecting the customer static information of the second set of customers; and applying data mining techniques to the second set of customers for which static information are stored but no network behavior data has been collected, said data mining techniques providing a probabilistic NVI for the second set of customers.

9. The computer program product of claim 6, wherein the method steps further comprise developing targeting for the marketing campaign based on the list of customers and their associated NVI.

* * * * *